(12) United States Patent
Allison et al.

(10) Patent No.: US 8,894,961 B2
(45) Date of Patent: Nov. 25, 2014

(54) SODIUM CYANIDE PROCESS

(75) Inventors: James David Allison, Memphis, TN (US); Brent Ellsworth Basham, Cordova, TN (US); Steven Lamar Grise, Landenberg, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 913 days.

(21) Appl. No.: 12/762,590

(22) Filed: Apr. 19, 2010

(65) Prior Publication Data

US 2010/0296995 A1    Nov. 25, 2010

Related U.S. Application Data

(60) Provisional application No. 61/180,460, filed on May 22, 2009.

(51) Int. Cl.
*C01C 3/08*    (2006.01)
*C01C 3/10*    (2006.01)

(52) U.S. Cl.
CPC .............. *C01C 3/10* (2013.01); *C01P 2006/80* (2013.01)
USPC ........................................................ 423/379

(58) Field of Classification Search
USPC ........................................................ 423/379
See application file for complete search history.

(56) References Cited

U.S. PATENT DOCUMENTS

| | | | |
|---|---|---|---|
| 1,591,630 A | | 7/1926 | Jacobs |
| 1,923,570 A | * | 8/1933 | Gabel ........................ 264/125 |
| 1,934,838 A | | 11/1933 | Andrussow |
| 1,957,749 A | | 5/1934 | Andrussow et al. |
| 2,186,234 A | * | 1/1940 | Boyd et al. ........................ 127/15 |
| 2,602,023 A | * | 7/1952 | Simms ............................ 23/301 |
| 2,708,151 A | | 5/1955 | McMinn |
| 2,726,139 A | | 12/1955 | Oliver |
| 2,773,752 A | | 12/1956 | Kremer et al. |
| 2,876,066 A | | 3/1959 | Inman |
| 2,944,344 A | | 7/1960 | Green et al. |
| 3,241,911 A | | 3/1966 | Guerin et al. |
| 3,365,270 A | * | 1/1968 | Guerin ........................ 423/379 |
| 4,083,935 A | * | 4/1978 | Makar ........................ 423/379 |
| 4,847,062 A | * | 7/1989 | Rogers et al. ............... 423/379 |
| 4,902,301 A | | 2/1990 | Rogers et al. |
| 5,383,940 A | | 1/1995 | Bober et al. |
| 5,958,588 A | | 9/1999 | Schutte et al. |
| 6,162,263 A | | 12/2000 | Day et al. |
| 2004/0197256 A1 | | 10/2004 | Rogers et al. |
| 2008/0203355 A1 | | 8/2008 | Deckers et al. |

FOREIGN PATENT DOCUMENTS

| | | |
|---|---|---|
| CN | 1057819 C | 1/1992 |
| CN | 1172071 A | 2/1998 |
| DE | 207886 | 8/1907 |
| DE | 663585 C | 8/1938 |
| DE | 1467211 | 7/1971 |

(Continued)

*Primary Examiner* — Shuangyi Abu Ali

(57) ABSTRACT

A process for the production of sodium cyanide crystals comprising;
(a) contacting impure hydrogen cyanide and sodium hydroxide in a reactor with mixing for a maximum contact time of about 5 seconds;
(b) feeding the resulting mixture to a continuous evaporative crystallizer to produce a slurry of sodium cyanide crystals;
(c) passing the slurry of sodium cyanide crystals from the crystallizer over a hot surface to precipitate onto the surface and remove sodium carbonate, and passing said slurry back to the crystallizer; and
(d) separating the sodium cyanide crystals from the slurry.

16 Claims, 1 Drawing Sheet

(56) References Cited

FOREIGN PATENT DOCUMENTS

Figure 1:
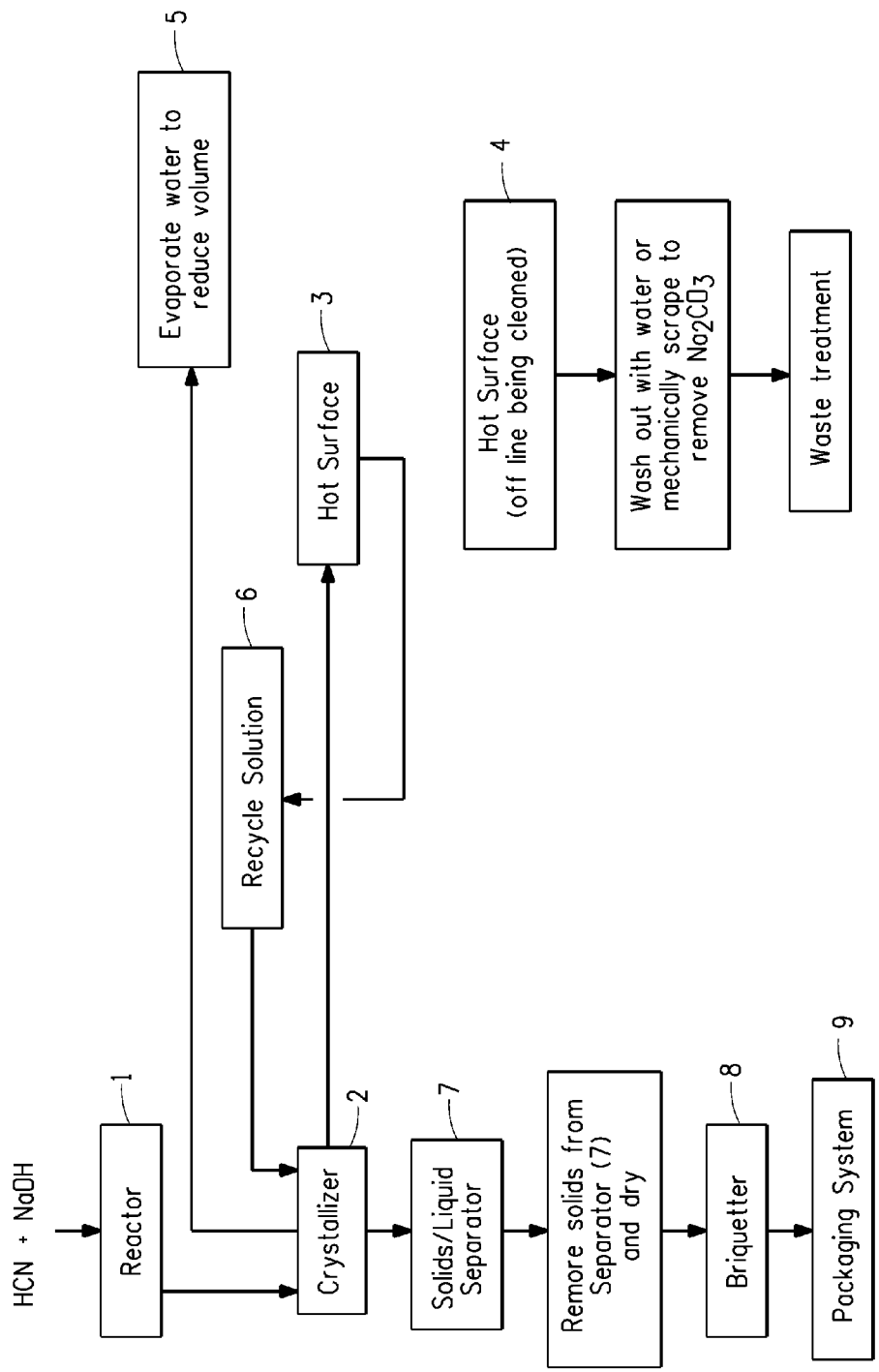

| | | |
|---|---|---|
| DE | 2445168 A | 4/1976 |
| DE | 146817 A | 3/1981 |
| DE | 156427 A1 | 8/1982 |
| DE | 201019 A | 6/1983 |
| DE | 246226 A | 6/1987 |
| DE | 275155 A | 1/1990 |
| DE | 3832883 A | 3/1990 |
| DE | 288503 A | 4/1991 |
| EP | 0360555 A1 | 9/1989 |
| FR | 1360388 | 5/1964 |
| GB | 0826581 A | 5/1909 |
| GB | 795424 A | 5/1958 |
| KR | 2006042695 | 5/2006 |
| KR | 645598 B1 | 11/2006 |
| PL | 103514 B1 | 6/1979 |

* cited by examiner

SODIUM CYANIDE PROCESS

FIELD OF THE INVENTION

This invention relates to a process for the production of sodium cyanide crystals by the neutralization of sodium hydroxide with impure hydrogen cyanide followed by crystallization and isolation of the product.

BACKGROUND OF THE INVENTION

Sodium cyanide is used in electroplating, treating metal surfaces, extracting and recovering metals from ores, and various chemical uses. It is produced by the neutralization of sodium hydroxide with hydrogen cyanide. Most often, producers use substantially pure anhydrous hydrogen cyanide to react with substantially pure sodium hydroxide. Hydrogen cyanide is produced commercially by various processes, for example, the Andrussow process, which catalytically reacts methane, ammonia and air. The synthesis product is a mixture of components, including the desired hydrogen cyanide as well as water, unreacted ammonia, hydrogen, nitrogen and oxides of carbon. Where substantially pure hydrogen cyanide is required, complicated and expensive rectification and isolation procedures are necessary to provide a satisfactory product.

Since there would be considerable savings in investment and operating cost if the procedures needed to purify hydrogen cyanide could be eliminated, there have been numerous attempts to use impure hydrogen cyanide gas to produce an aqueous cyanide solution for conversion to anhydrous sodium cyanide. However, when hydrogen cyanide synthesis gas is directly absorbed in sodium hydroxide, the aqueous solutions produced contain measurable quantities of impurities absorbed from the impure gases. One of the primary impurities in the aqueous solution is sodium carbonate formed by reaction of carbon dioxide with the sodium hydroxide neutralizing agent. Various processes have been used to remove the sodium carbonate before crystallization, or to decrease its formation by causing a different precipitant to form.

U.S. Pat. No. 4,847,062 teaches a continuous process for making sodium cyanide that employs a classifying crystallizer and an absorber to directly absorb hydrogen cyanide gas onto a cyanide solution without use of any agents to remove sodium carbonate. However, this process produces sodium cyanide having an approximate purity of 95% or less.

Typically, the sodium cyanide is formed into briquettes by dry compression methods and shipped to users who generally dissolve the sodium cyanide in water to make an aqueous solution to be used in their process. To be acceptable, crystals must have a high enough sodium cyanide concentration such that, when diluted, the weight percent sodium cyanide is high enough for the intended purpose.

Thus there is a need for an improved process for the production of sodium cyanide to obtain product of high purity levels from an impure hydrogen cyanide starting material. The present invention provides such a process.

BRIEF SUMMARY OF THE INVENTION

The present invention comprises a process for the production of sodium cyanide crystals comprising;
(a) contacting impure hydrogen cyanide and sodium hydroxide in a reactor with mixing for a maximum contact time of about 5 seconds;
(b) feeding the resulting mixture to a continuous evaporative crystallizer to produce a slurry of sodium cyanide crystals;
(c) recycling the slurry of sodium cyanide crystals from the crystallizer over a hot surface to precipitate onto the surface and remove sodium carbonate, and passing said slurry back to the crystallizer; and
(d) separating the sodium cyanide crystals from the slurry.

BRIEF DESCRIPTION OF THE DRAWING(S)

FIG. 1 is a block diagram representing the steps of the process of the present invention for the production of sodium cyanide.

DETAILED DESCRIPTION OF THE INVENTION

Any trademarks used herein are denoted as capitalized.
"NaCN" as used herein means sodium cyanide, dissolved or solid.
"NaOH" as used herein means sodium hydroxide.
"HCN" as used herein means hydrogen cyanide.
"$Na_2CO_3$" as used herein means sodium carbonate, anhydrous or hydrated.

The present invention comprises a process for the production of 98% purity NaCN crystals that can be efficiently dried and compressed into briquettes by directly absorbing impure HCN synthesis gas in aqueous NaOH. The contact time of the HCN and NaOH in a reactor is minimized to decrease formation of large amounts of sodium carbonate. The NaCN solution formed is passed directly to a continuous crystallizer without removal of any sodium carbonate that is formed. The NaCN solution is crystallized to form a slurry of NaCN crystals. The NaCN crystal slurry from the crystallizer is passed over a hot surface to provide heat for evaporation and to precipitate and remove the sodium carbonate, and the slurry is then recycled back to the crystallizer. The NaCN crystal slurry is then fed to a solids/liquid separator of standard design to dewater the crystals. The dewatered crystals are then dried.

The invention employs direct absorption of the HCN synthesis gas, which contains, among other components, water, oxides of carbon, and inerts, in aqueous NaOH. The HCN is synthesized by use of any of a variety of known processes. One example is by use of the Andrussow process as described in U.S. Pat. Nos. 1,934,838 and 1,957,749. The HCN synthesis gas is fed to the reactor of the process of the present invention. The temperature of the HCN gas can range from about 70° C. to about 600° C. depending on the design of the equipment employed. The temperature can be increased or decreased as needed. Preferably, the temperature of the HCN synthesis gas input into the process of this invention should be from about 70° C. to 300° C. The HCN is added both in the form of a gas or liquid, and the NaOH is added as an aqueous solution to form an aqueous NaCN solution. Preferably, the reaction between the HCN and NaOH is controlled to minimize the oxides-of-carbon content, which preferably should be controlled to between from about 0.5 to about 1.5 weight percent.

The aqueous NaOH added to the reactor can be any concentration, preferably 50 weight percent or higher NaOH. It is necessary to maintain excess alkalinity in the absorbing cyanide solution in order to prevent HCN from polymerizing during the mixing in the reactor. Continuous operation permits controlling the alkalinity at a low level. In a continuous operation free NaOH is kept as low as possible to minimize carbon dioxide absorption and to permit sodium carbonate to react with the HCN, but high enough to avoid polymer formation. Lower NaOH concentrations can be used when the temperature is low and when sodium carbonate is in the system. The alkalinity is controlled so that the percent NaOH does not fall below 0.1 weight percent. Preferably, the percent NaOH is controlled at 0.1 to 3 weight percent, and more preferably at 0.1 to 0.5 weight percent. NaOH concentration can be controlled by pH or other suitable means.

Direct absorption of HCN gas in NaOH solution is advantageously conducted at temperatures in the range of from about 30° C. to about 100° C. Preferably the temperature is from about 55° C. to about 75° C. Keeping the temperature low reduces the tendency for HCN to polymerize and minimizes decomposition of NaCN to ammonia and sodium formate, which can result in a loss of yield as well as contamination of the NaCN product. Since the tendency to polymerize is reduced at lower temperatures, the excess alkalinity necessary to avoid polymerization is lower, thereby permitting production of NaCN solutions of higher purity.

Higher reactor temperatures can be used with commensurate energy savings, but an increase in impurities would be expected. One skilled in the art will be able to adjust temperature based on purity needs. Also, as the absorption temperature increases, more and more water will be carried out of the reactor with the inerts until finally more will be carried out than is entering with the synthesis gas, aqueous NaOH, and water of reaction. As the reactor solution becomes saturated, NaCN crystals can form in the reactor.

The HCN and NaOH are contacted with mixing for a minimum amount of time to minimize the formation of sodium carbonate. Contact time for the reaction is for a maximum of about 5 seconds. Preferably the contact time in the reactor is from about 0.01 to about 2 seconds, more preferably less than 1 second, and even more preferably from about 0.06 to about 0.1 seconds. The reaction time is controlled by control of the rate of feed of HCN into the reactor and the surface area of the reactor. The reactor vessel provides a specific surface area for contact of the HCN gas and liquid NaOH. The reactor vessel is designed to achieve a specific contact time with a specific feed rate of HCN. This determines the residence time in the reactor. The very short contact time during the limited residence in the reactor in combination with the later recycle step contributes to product of very high purity of about 98% or higher. The resulting mixture is then fed directly to a crystallizer, preferably an evaporative continuous crystallizer, to produce a slurry of sodium cyanide crystals. Any of a variety of crystallizers can be employed such as a classifying crystallizer, a forced convection crystallizer, a draft tube crystallizer, or others as known in the art. One of the primary impurities in the mixture is sodium carbonate formed by reaction of carbon dioxide with the NaOH neutralizing agent. Sodium carbonate so formed is soluble in the saturated NaCN solution formed to about 1.5% by weight. During evaporation and crystallization of NaCN, the sodium carbonate will crystallize and become an impurity in the NaCN product. In addition, since sodium carbonate has an inverse solubility relationship in aqueous NaCN solutions, less will stay in solution as the temperature of the solution is increased. Thus, sodium carbonate can precipitate on surfaces where surface temperatures can be high, for example, the evaporator calandria heating surface would be expected to foul. As that heating surface begins to foul, heat transfer would be made more difficult thereby increasing the cost of operation. As more fouling occurs, one would expect eventual interruption of operation of the evaporative crystallizer.

However, the process of the present invention employs the solubility of sodium carbonate and its tendency to precipitate to remove it from the NaCN solution. The slurry of NaCN crystals formed in the crystallizer is passed across a hot surface to precipitate and remove the sodium carbonate, and the slurry is then recycled back to the crystallizer. The hot surface is designed so that the surface is hot enough to precipitate out the sodium carbonate, but not so hot as to decompose the NaCN. The temperature of the hot surface is from about 50° C. to about 250° C., preferably from about 50° C. to about 150° C. The hot surface used in the process of the present invention is one that can be easily cleaned without interruption of the operation of the process. Alternatively, the process can be temporarily stopped for cleaning of the surface. Examples of suitable hot surfaces include a heat exchanger, drum, double drum contact dryer, or other similar equipment. As the sodium carbonate precipitates onto the hot surface, the heat transfer becomes less efficient. A film of sodium carbonate is formed on the surface and is measured via pressure or temperature differential to determine when the efficiency of the surface has been decreased to the point of adversely affecting the process. At this point the slurry of NaCN crystals is directed to a different area of the hot surface or to an alternative hot surface, while the deposited sodium carbonate is cleaned off of the original surface. A plurality of any number and size of hot surfaces can be employed in the process, aligned in parallel systems, tandem systems, or otherwise. Alternatively, a single large hot surface can be employed having multiple discrete designated areas on the surface. The hot surfaces have suitable mechanisms for switching the flow of the slurry of NaCN crystals from one area of a surface to a different area of a surface, or from one surface to another surface, to maximize efficiency of the process. The sodium carbonate is typically cleaned from the hot surface temporarily removed from the operating process by washing with water or other suitable cleaner or by mechanically scraping.

After removal of the sodium carbonate the slurry of NaCN crystals is recycled to the crystallizer. Upon recycle of the slurry to the crystallizer, it is combined in the crystallizer with feed from the reactor. The ratio of new feed from the reactor to recycle feed is adjusted to maintain conditions for control of the purity of the NaCN product. The slurry is recycled continuously from the crystallizer over a hot surface and back to the crystallizer to increase the purity of the NaCN crystals.

Any HCN stripped by water vapors is recovered and utilized in the process for reasons of economics and environmental control. The HCN that exits with the water vapors is continuously replaced to maintain equilibrium avoiding the high levels of NaOH in the crystallizer mother liquor. High NaOH concentrations cause reduced caustic yield (less NaCN is produced than theoretically should be based on the initial NaOH concentration), lower product purity and more sodium carbonate precipitation.

The NaCN crystal slurry from the crystallizer is fed to a solids/liquid separator of standard design to dewater the crystals. Examples of suitable separators include centrifuges, filtering devices, hydroclones, settlers, and other conventional separators. Some or all the mother liquor from the separator is recycled to the reactor when the crystallizer is a nonclassifying crystallizer. The dewatered crystals are then dried using conventional means. Typically, the dried NaCN is formed into briquettes or other compacted shapes by dry compression methods and packaged in a manner to minimize contact with moisture for shipping to end users. The process of the present invention produces NaCN of 98% purity or higher. The purity can be 98.5%, 99%, 99.5% or potentially 100%. Thus it is suitable for a wide variety of end uses.

One particular embodiment of the process of the present invention is described by reference to FIG. 1. Reactor 1 is equipped with an external cooling device, such as a liquid circulating loop consisting of a pump and heat exchanger, and a venting mechanism to a pollution control unit. Impure HCN gas is fed into Reactor 1. Aqueous 50% NaOH is fed into Reactor 1. The size of Reactor 1 is designed, in combination with the rate of feed of HCN, to permit a contact time of the HCN with the NaOH in Reactor 1 of less than one second. The alkalinity of the NaOH solution is controlled so that the percent NaOH is from about 0.1 to about 3 weight percent. The temperature is maintained at about 55° C. to about 75° C. during contacting of the HCN and NaOH. Direct absorption of the HCN gas by the NaOH solution occurs upon contact producing NaCN solution. The NaCN solution is then removed from the bottom of Reactor 1 and fed into Crystallizer 2 via a transfer line. Crystallizer 2 is a continuous evaporative crystallizer which produces a slurry of NaCN crystals. Vapors exit Crystallizer 2 through an exit line to a pollution control device. The majority of the slurry of NaCN crystals, via a transfer line, is directed across a Hot Surface 3, such as a heat exchanger. The temperature of the Hot Surface 3 is maintained at from about 50° C. to about 150° C., and $Na_2CO_3$ precipitates out of the slurry onto the Hot Surface 3. As $Na_2CO_3$ builds up on Hot Surface 3, the slurry of NaCN crystals is directed across Hot Surface 4, and Hot Surface 3 is cleaned. Hot Surface 4 is maintained at from about 50° C. to about 150° C., and upon contact with the slurry, $Na_2CO_3$ precipitates out of the slurry onto Hot Surface 4. As $Na_2CO_3$ builds up on Hot Surface 4, the slurry of NaCN crystals is directed across Hot Surface 3, and Hot Surface 4 is cleaned. Thus the slurry is alternatively directed across either Hot Surface 3 or Hot Surface 4 while the other is being cleaned. The slurry is then recycled to Crystallizer 2 as Recycle Solution 6. The Recycle Solution 6 is added back to Crystallizer 2, where it is mixed with solution from Reactor 1, and again passed over Hot Surface 3 or 4 with recycle back to Crystallizer 2. Water is evaporated from the Crystallizer 2, denoted as step 5, to concentrate the NaCN solution to levels to precipitate the NaCN. This system produces a purified slurry of NaCN crystals which exits the bottom of Crystallizer 2 and is directed via a transfer line to a Solids/liquids Separator 7. The NaCN crystals are separated from the liquid and are discharged from Separator 7 and dried. The dried NaCN crystals are then transported to Briquetter 8 where the crystals are formed into briquettes. The briquettes are then transferred to Packaging System 9 for packaging for shipment to purchasers.

Normally fouling of hot surfaces creates operating difficulties and must be avoided. In the process of the present invention, conditions are created and controlled to purposely foul hot surfaces over which a slurry of sodium cyanide crystals is passed in order to produce high purity (greater than 98%) sodium cyanide. The process of the present invention provides several advantages. High purity NaCN of 98% or higher is obtained using impure HCN as a starting material. Thus the very high expense of making or purchasing pure or refined HCN is avoided. The fouling of the crystallizer with precipitated sodium carbonate is avoided, along with the need to shut down the operating line to clean the crystallizer. Use of traditional batch evaporators is eliminated resulting in a more cost effective process. Also the traditional use of liquid purges to obtain high purity NaCN is avoided. This eliminates the need for waste treatment of such purges, or the need to sell diluted product from the purges which has high shipping costs. In the process of the present invention the combination of fast short reaction time in the reactor with use of a hot surface to remove sodium carbonate provides high purity NaCN crystals in a manner that is more efficient and economical than prior art processes.

EXAMPLES

Example 1

Reference numbers used in this Example refer to FIG. 1. Sodium hydroxide, commercially available from PPG Industries Inc., Pittsburgh, Pa., was fed into a reactor 2 feet by 8 feet (0.6 m by 2.4 m) in size, denoted as Reactor 1. Impure hydrogen cyanide gas, generated using a conventional Andrussow process, was fed directly from the HCN synthesis into Reactor 1 at a rate of 87,700 pounds per hour (39,150 kg per hour). The impure gas contained hydrocyanic acid, water, ammonia, methane, hydrogen, nitrogen, and carbon oxides. The contact time of the HCN with the NaOH in Reactor 1 was from about 0.06 to about 0.1 second. The alkalinity of the NaOH solution was controlled so that the percent NaOH was from about 0.1 to about 2.0 weight percent exiting the Reactor 1. The temperature was maintained at about 55° C. to about 75° C. during contacting of the HCN and NaOH. Direct absorption of the HCN gas by the NaOH solution occurred upon contact to produce NaCN solution. The NaCN solution was then removed from the bottom of Reactor 1 and was fed into Crystallizer 2 via a transfer line. Crystallizer 2 was a continuous evaporative crystallizer which produced a slurry of NaCN crystals. The majority of the slurry of NaCN crystals, via a transfer line, was directed across a Hot Surface 3, a heat exchanger 780 square feet (72.5 m$^2$) in size. The temperature of the Hot Surface 3 was maintained at from about 50° C. to about 150° C., and $Na_2CO_3$ precipitated out of the slurry onto the Hot Surface 3. As $Na_2CO_3$ built up on Hot Surface 3, the heat transfer became less efficient. A measure of the differential temperature was used to determine any decrease in the efficiency of the process. An increase in pressure drop across hot Surface 3 was also noticed, indicating restriction of flow due to precipitation. When the efficiency decreased to the point where process performance was unsustainable, the process was temporarily shut down. Hot Surface 3 was cleaned without de-inventory of the balance of the process and the process restarted. On restart, the process operation returned to normal. The cleaned hot surface was equivalent to directing flow to Hot Surface 4 of FIG. 1 as described in the process of the present invention. The Hot Surface 4 was allowed to foul with $Na_2CO_3$ precipitate. As $Na_2CO_3$ built up on Hot Surface 4, the heat transfer became less efficient. A measure of the differential temperature was used to determine the decrease in the efficiency of the process. An increase in pressure drop across Hot Surface 4 was also noticed, indicating restriction of flow due to precipitation. When the efficiency decreased to the point that process performance was unsustainable, the process was temporarily shut down. Hot Surface 4 was cleaned without de-inventory of the balance of the process, and the process restarted. On restart, the process again returned to normal. The cleaned hot surface was equivalent to directing flow back to Hot Surface 3. The process was temporarily stopped at regular intervals to clean the hot surface, thus simulating the alternation of flow between Hot Surface 3 and Hot Surface 4. The slurry was recycled to Crystallizer 2 as Recycle Solution 6. The Recycle Solution 6 was added back to Crystallizer 2, where it was mixed with solution from Reactor 1. The slurry of NaCN crystals from Crystallizer 2 was continuously passed over hot surface with recycle back to Crystallizer 2. This system produced a purified slurry of NaCN crystals which exited the bottom of Crystallizer 2 and was directed via a transfer line to a Solids/liquids Separator 7.

The NaCN crystals were separated from the liquid and were discharged from Separator 7 through an exit line and dried. The NaCN crystals were analyzed and found to be of 98% purity. The dried NaCN was then briquetted and screened using standard briquetting and screening processes.

Example 2

Example 2 employed the Environmental Simulation Program (The ESP®) software, commercially available from OLI Systems, Inc., Morris Plains, N.J., validated against Example 1. The same process conditions as Example 1 above were employed except that the contact time of the HCN with the NaOH in Reactor 1 was increased to about 0.5 seconds, and the process was alternated between two hot surfaces instead of temporarily stopping the process for cleaning of the surface. All other aspects of this Example 2 were the same as Example 1. The result of the change in contact time was that the alternation frequency between hot surfaces was significantly increased (on the order of five times) relative to that described in the previous Example 1. The NaCN crystals were indicated to be of greater than 98% purity.

Example 3

Example 3 employed The ESP®, commercially available from OLI Systems, Inc., Morris Plains, N.J., as in Example 2 and was validated against Example 1. The same process conditions as Example 1 above were employed except that the alkalinity of the NaOH solution was controlled so that the percent NaOH was less than about 1.0 weight percent exiting the Reactor 1, and the process was alternated between two hot surfaces instead of temporarily stopping the process for cleaning of the surface. All other aspects of this Example 3 are the same as Example 1. The result of the change NaOH concentration was that the alternation frequency between hot surfaces was significantly decreased (on the order of four times) relative to that described in the previous Example 1. The NaCN crystals were indicated to be of greater than 98% purity.

What is claimed is:

1. A process for the production of sodium cyanide crystals comprising;
    (a) contacting impure hydrogen cyanide and sodium hydroxide in a reactor with mixing for a maximum contact time of 5 seconds;
    (b) feeding the resulting mixture to a continuous evaporative crystallizer to produce a slurry of sodium cyanide crystals;
    (c) passing the slurry of sodium cyanide crystals from the crystallizer via a transfer line and alternating the flow of the slurry between at least two heat exchangers or at least two discrete areas of a hot surface to purposefully precipitate and remove sodium carbonate onto one heat exchanger or one area of the hot surface, while deposited sodium carbonate is cleaned from the other heat exchangers or other areas of the hot surface, and continuously recycling said heated slurry back to the crystallizer after removal of the sodium carbonate; and
    (c) separating the sodium cyanide crystals from the slurry.

2. The process of claim 1 wherein the maximum time in the reactor is from about 0.01 seconds to about 2 seconds.

3. The process of claim 1 wherein the time in the reactor is controlled by the rate of feed of HCN into the reactor.

4. The process of claim 1 wherein the hot surface is at a temperature of from about 50° C. to about 250° C.

5. The process of claim 1 wherein the hot surface is cleanable without interruption of the operation of the process.

6. The process of claim 1 wherein the hot surface is one or more heat exchangers.

7. The process of claim 1 wherein the hot surface is comprised of a plurality of surfaces or a plurality of surface areas having a mechanism for directing the slurry of sodium cyanide crystals from one such surface or surface area to another.

8. The process of claim 7 wherein the plurality of surfaces are aligned for operation in parallel or in tandem.

9. The process of claim 7 wherein pressure or temperature differential is used to determine when to direct the slurry of sodium cyanide crystals from the crystallizer from one surface or surface area to another, prior to recycle back to the crystallizer.

10. The process of claim 7 wherein after the slurry of sodium cyanide crystals is directed from one surface or surface area to another, the original surface or surface area is cleaned of precipitated sodium carbonate.

11. The process of claim 1 further comprising
    (e) drying the sodium cyanide crystals; and
    (f) forming the sodium cyanide crystals into briquettes or other compacted shapes.

12. The process of claim 11 further comprising packaging the briquettes to minimize contact with moisture.

13. The process of claim 1 wherein the sodium cyanide crystals produced are of greater than or equal to 98% purity.

14. The process of claim 1 wherein the sodium cyanide crystals produced are of greater than or equal to 99% purity.

15. The process of claim 1 wherein the maximum time in the reactor is less than 1 second.

16. The process of claim 1 wherein the maximum time in the reactor is from about 0.06 seconds to about 0.1 seconds.

* * * * *